July 30, 1957     C. C. J. RIESEBECK     2,800,940
DEVICE FOR CARRYING RECEPTACLES
Filed Sept. 11, 1952     6 Sheets-Sheet 1

Inventor
Curt Carl Johannes Riesebeck

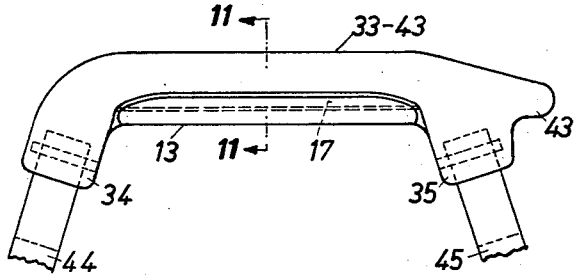
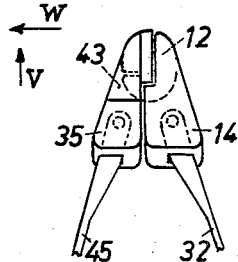
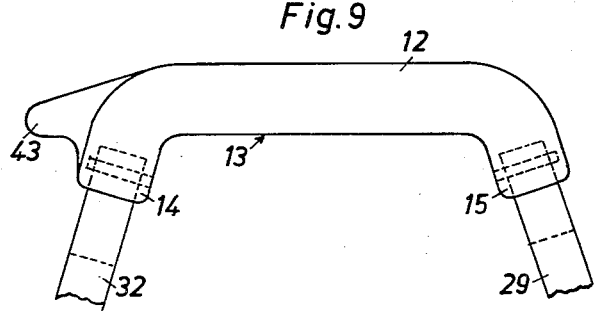
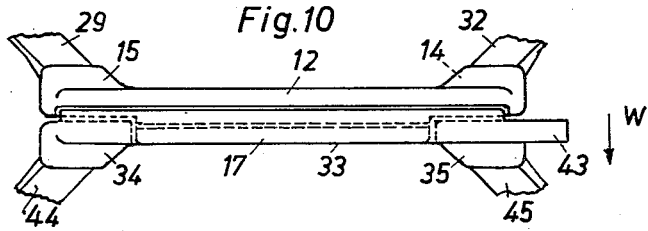
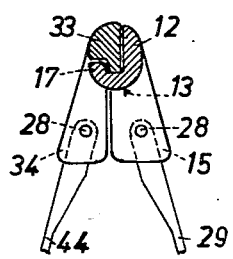

July 30, 1957 C. C. J. RIESEBECK 2,800,940
DEVICE FOR CARRYING RECEPTACLES
Filed Sept. 11, 1952 6 Sheets-Sheet 3
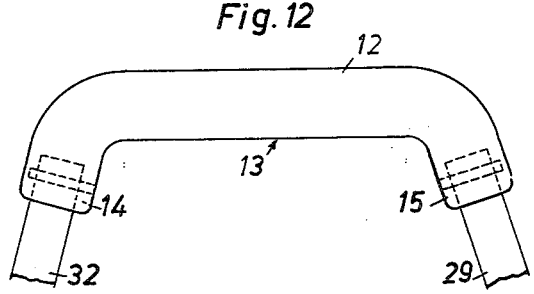
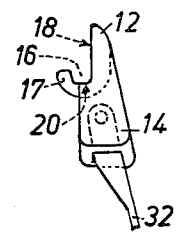
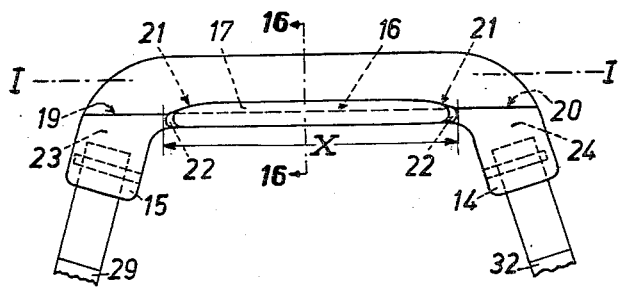
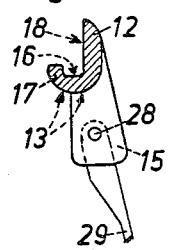
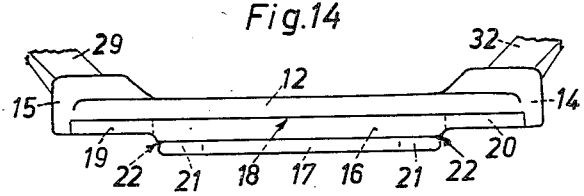
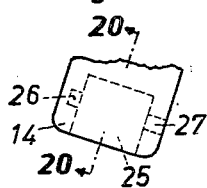
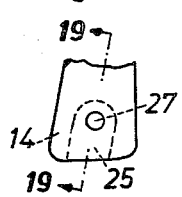
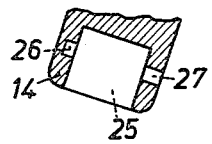
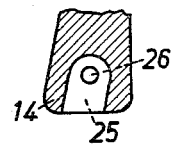
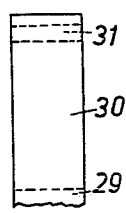
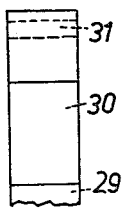
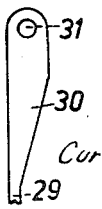
Inventor:
Curt Carl Johannes Riesebeck July 30, 1957  C. C. J. RIESEBECK  2,800,940
DEVICE FOR CARRYING RECEPTACLES
Filed Sept. 11, 1952  6 Sheets-Sheet 4
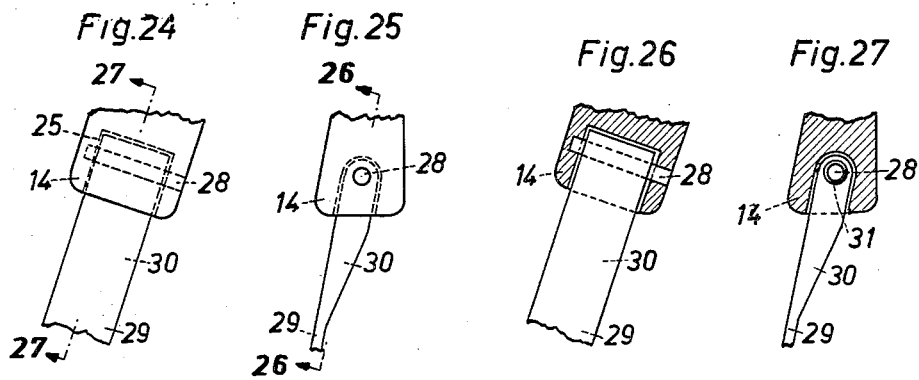
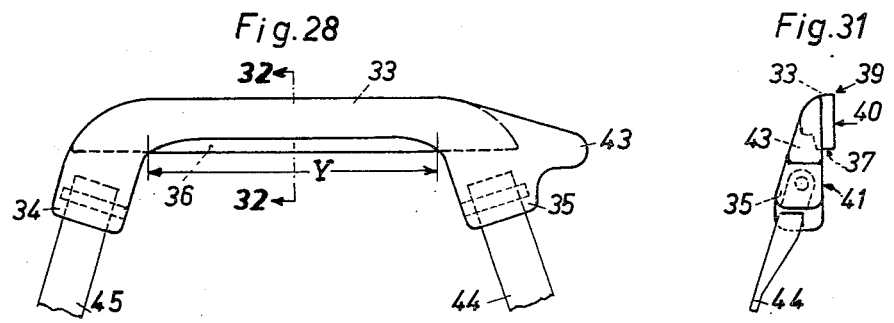
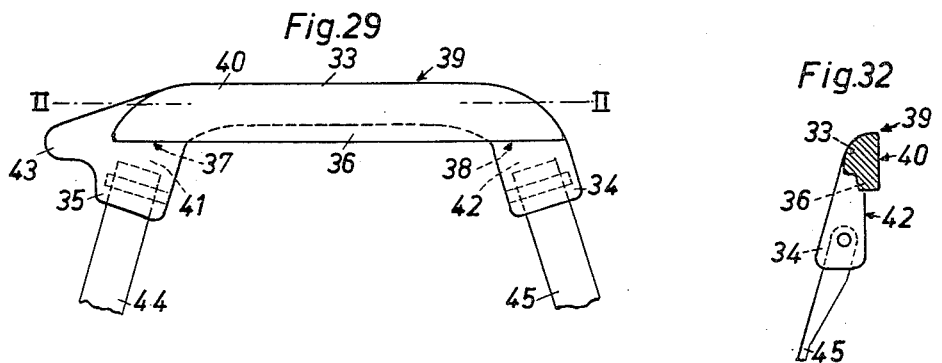
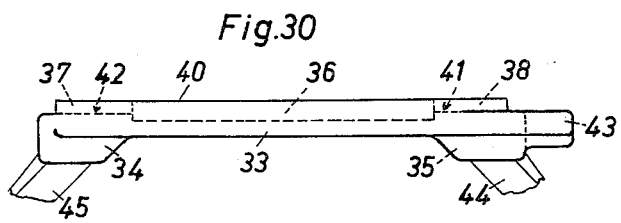
Inventor:
Curt Carl Johannes Riesebeck July 30, 1957 C. C. J. RIESEBECK 2,800,940
DEVICE FOR CARRYING RECEPTACLES
Filed Sept. 11, 1952 6 Sheets-Sheet 5
Fig.33
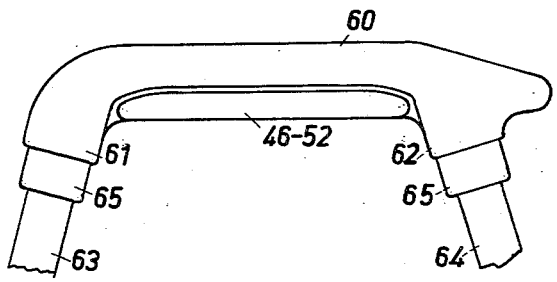
Fig.34
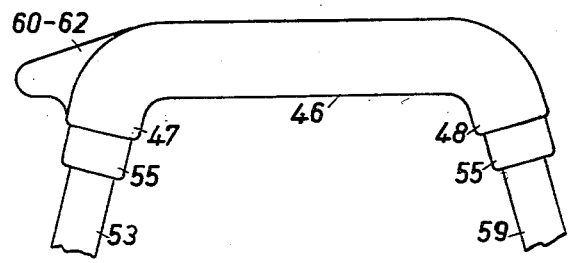
Fig.35 Fig.36 Fig.37 Fig.38
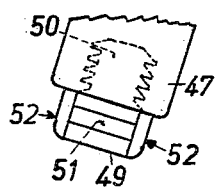 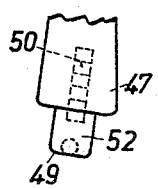 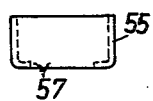 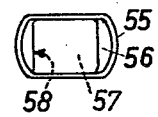
Fig.39 Fig.40 Fig.41
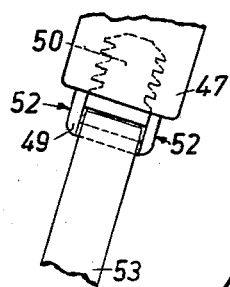 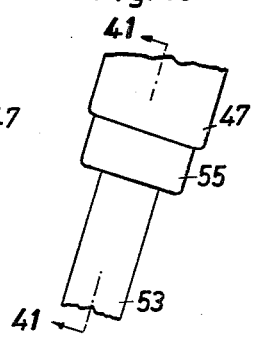 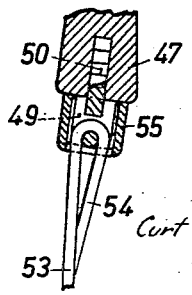
Inventor:
Curt Carl Johannes Riesebeck July 30, 1957  C. C. J. RIESEBECK  2,800,940
DEVICE FOR CARRYING RECEPTACLES
Filed Sept. 11, 1952  6 Sheets-Sheet 6
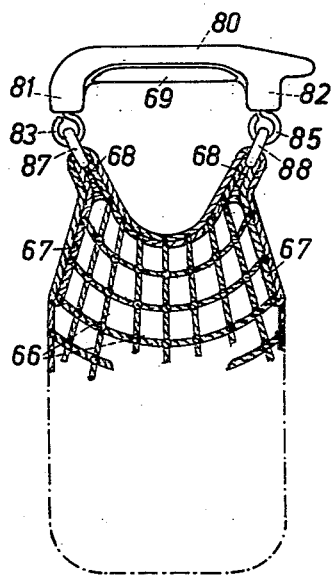
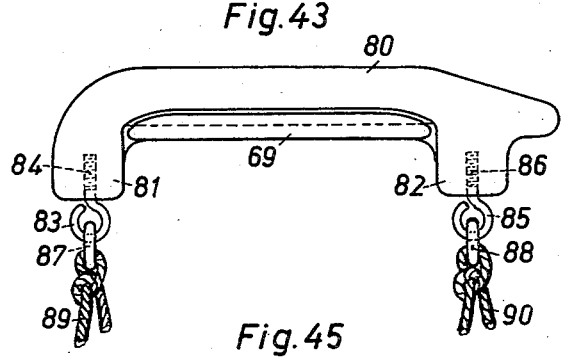
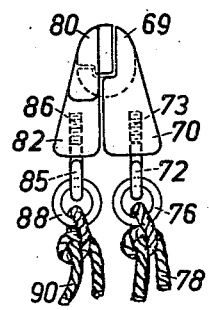
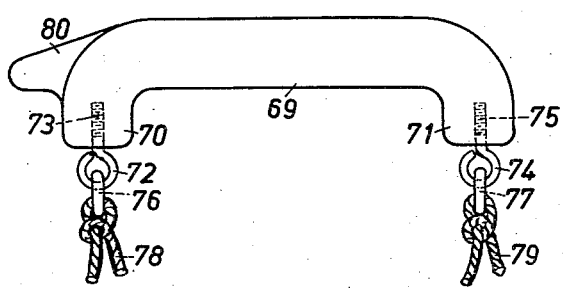
Inventor:
Curt Carl Johannes Riesebeck United States Patent Office 2,800,940
Patented July 30, 1957

2,800,940

DEVICE FOR CARRYING RECEPTACLES

Curt Carl Johannes Riesebeck, Darching, Bavaria, Germany

Application September 11, 1952, Serial No. 309,028

10 Claims. (Cl. 150—12)

My invention relates to devices adapted to carry receptacles of a wide variety of types, and more particularly to devices adapted to carry the receptacles or containers of handbags, shopping bags, shopping nets and other types of bags or containers.

One object of my invention is to provide a device adapted to carry receptacles or containers of various kinds, this device being provided with carrying handles of novel construction which render it possible, in combination with bag containers of the type referred to above, to provide handbags of improved construction which are capable of being carried, held open or transported in an ideal and convenient manner without any necessity arising for the said carrying handles to be held together while the said handbag is being carried, this device being further adapted to rapid use and hygienic cleaning.

A further object of my invention is to provide a device adapted to carry receptacles or containers of various kinds, this device including two carrying handles adapted to be connected with one another and to be individually attached to the said receptacle or container, a first of the said carrying handles, while being adapted to receive, carry and hold in position a second carrying handle, having a handle surface of substantial size permitting to carry the entire handbag, the said second carrying handle being adapted for easy insertion into the said first carrying handle adapted to receive, carry and hold in position the said second carrying handle, the two said carrying handles being further adapted for being easily and reliably separated from one another.

Other objects and advantages of my invention will be made manifest in the following description and accompanying drawings.

While my invention may be generally used in combination with receptacles or containers of a wide variety of types, including containers taking the shape of boxes, bags or nets, it is represented in the following description and accompanying drawings in combination with the container, not capable of being locked, of a bag known as a shopping bag. My invention is further illustrated in an embodiment intended for elegant handbags and, in still another embodiment, in combination with the net-like bag-shaped container of a shopping net.

My invention will now be fully explained in the following description and the particular pertinent features of construction will be stated in the claims in connection with the accompanying drawings which illustrate a preferable embodiment of my invention.

In the drawings,

Figure 1 represents a front elevational view of a device adapted to carry containers of the type referred to above and illustrates the combination of said device with the container of a shopping bag, the said device being constructed in accordance with the principle underlying my invention; in Figure 1, the carrying handles of novel construction are in the position required for carrying the bag, the handles being in mutual engagement;

Figure 7 is a front elevational view of the novel device for carrying containers and also shows a fragmentary view of the attached straps; both carrying handles are in the position required for carrying the bag, the handles being in mutual engagement;

Figure 8 is en end elevational view of Figure 7;

Figure 9 is a rear view of Figure 7;

Figure 10 is a plan view of Figure 7;

Figure 11 is a cross-sectional view along the line 11—11 in Figure 7;

Figure 12 is a front elevational view of the main handle forming part of the embodiment illustrated in Figures 7 to 11 and also shows a fragmentary view of the attached straps;

Figure 13 is a rear view of Figure 12;

Figure 14 is a plan view of Figure 12;

Figure 15 is an end elevational view of Figure 12;

Figure 16 is a cross-sectional view taken along the line 16—16 in Figure 13;

Figure 17 is a fragmentary front elevational view, on a larger scale, of one end of the main handle illustrated in Figures 12 to 16;

Figure 18 is an end elevational view of Figure 17;

Figure 19 is a longitudinal section taken along the line 19—19 in Figure 18;

Figure 20 is a vertical section taken along the line 20—20 in Figure 17;

Figure 21 is a fragmentary front elevational view of a flexible strap which is arranged on the said main handle;

Figure 22 is a rear view of Figure 21;

Figure 23 is an end elevational view of Figure 21;

Figure 24 is a fragmentary front elevational view of one end of the said main handle and of a strap attached to the handle;

Figure 25 is an end elevational view of Figure 24;

Figure 26 is a longitudinal section taken along the line 26—26 in Figure 25;

Figure 27 is a vertical section taken along the line 27—27 in Figure 24;

Figure 28 is a front elevational view of the secondary handle of the receptacle carrying device illustrated in Figures 7 to 11 and includes a fragmentary view of the attached straps;

Figure 29 is a rear view of Figure 28;

Figure 30 is a plan view of Figure 28;

Figure 31 is an end elevational view of Figure 28;

Figure 32 is a transverse section taken along the line 32—32 in Figure 28;

Figure 33 is a fragmentary front elevational view of an alternative embodiment of the device according to the invention;

Figure 34 is a rear view of Figure 33;

Figure 35 is a front elevational view of one end of the main handle of the novel device illustrated in Figures 33 and 34 and also shows a suspension member;

Figure 36 is an end elevational view of Figure 35;

Figure 37 is an elevational view of a protective cap member;

Figure 38 is a plan view of the protective cap member illustrated in Figure 37;

Figure 39 is a front elevational view of the end of the main handle illustrated in Figures 35 to 38 and also shows a fragmentary view of an attached strap;

Figure 40 is a side view of Figure 39;

Figure 41 represents a vertical section taken along the line 41—41 in Figure 40;

Figure 42 is a front elevational view of an alternative embodiment of the device according to the invention in combination with a net-like receptacle;

Figure 43 is a front elevational view of the main and secondary handles of the device shown in Figure 42;

Figure 44 is an end elevational view of Figure 43;

Figure 45 is a rear view of Figure 43.

Figure 1:
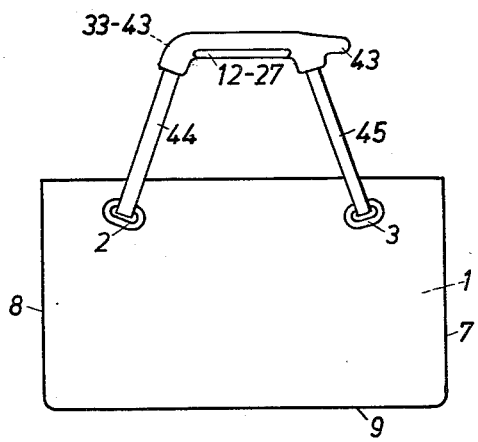
Figure 2:
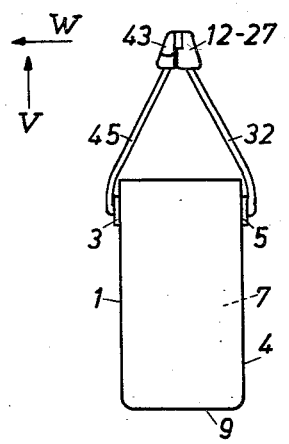
Figure 2 is an end elevational view of the construction shown in Figure 1.
Figure 3:
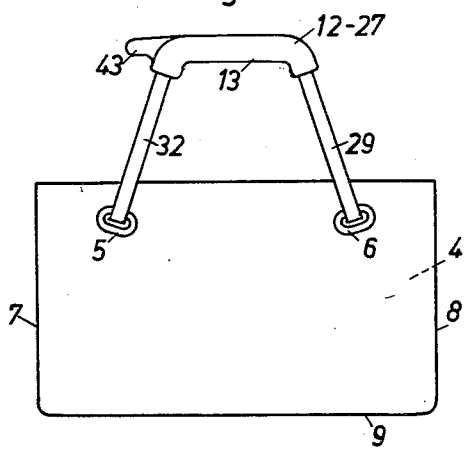
Figure 3 is a rear view of the construction shown in Figure 1.

The novel device for carrying receptacles or containers which is illustrated in Figures 1 to 6 where it is shown in combination with the container of a shopping bag, and which is further illustrated in detail in Figures 7 to 33, comprises two carrying handles adapted to be connected to one another and means by which the said carrying handles are individually attached to the container of the handbag, these means permitting universal movement of the said handles relative to the said container, one of the carrying handles in the following being termed "main handle," the other carrying handle being termed "secondary handle."

The container of the handbag is shown in the general shape of a box comprising a front wall 1 to which the secondary handle 33—43 is attached for universal movement with the aid of fastening means, a back wall 4 to which the main handle 12—27 is attached for universal movement with the aid of suitable fastening means, two side walls 7 and 8, a bottom 9 and a container space 10, not capable of being locked, with an opening 11 which is accessible from above, the container being made in a known manner of any suitable handbag material.

Figure 5:
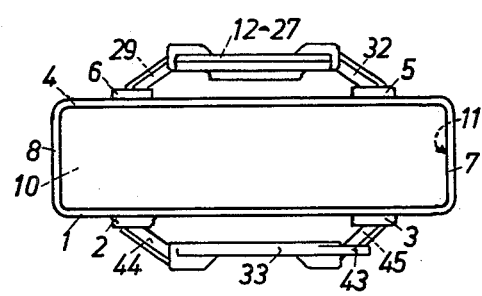
Figure 5 is a plan view of the embodiment shown in Figures 1 to 4 with the carrying handles of novel construction not being in the position required for carrying the bag, i. e. with said handles being separated from one another.
Figure 4:
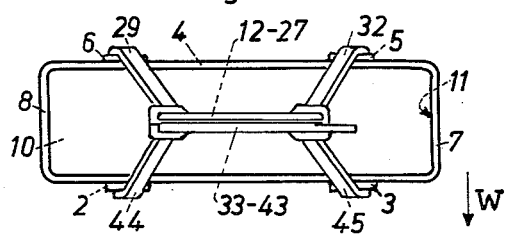
Figure 4 is a plan view of the construction shown in Figure 1.
Figure 6:
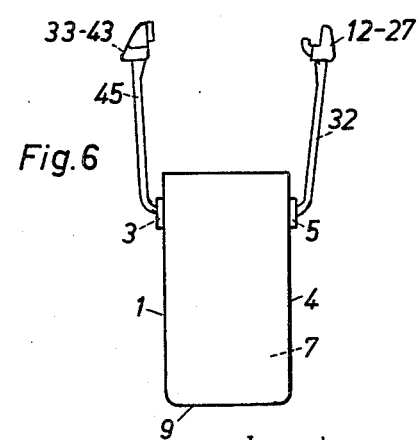
Figure 6 is an end elevational view of Figure 5.

The main handle 12—27 attached for universal movement to the back wall 4 of the container is adapted, when in its carrying position illustrated in Figures 1 to 4, to permit, while the handbag is being carried by one hand, the universally movable secondary handle 33—43 attached to the front wall 1 of the container to be held in position and to be supported, and is further adapted to permit of the entire handbag and its contents to be carried in a convenient manner by one hand without it being necessary to use the hand to hold the secondary handle 33—43 in position on the main handle 12—27; moreover, the said main handle 12—27 is adapted, when in its open position indicated in Figures 5 and 6, to permit rapid and convenient access to the container space 10 and to enable the container to be emptied. In addition, the main handle 12—27, when in its carrying position (Figures 1 to 4), is adapted to absorb all forces introduced into the main handle as well as into the secondary handle 33—43 by the weight of the handbag container, and is adapted, when in its open position (Figures 5 and 6) to afford rapid and easy access to the container space for rapid and convenient emptying of the same.

It is the purpose of the secondary handle 33—43, which is attached for universal movement to the front wall 1 of the container, when in its carrying position (Figures 1 to 4) while the handbag is being carried, to be held in position by the aforementioned main handle 12—27, and it is another purpose of the secondary handle 33—43 to transmit the forces introduced into it by the weight of the bag and its contents to the main handle 12—27 which holds in position and supports the said secondary handle. Moreover, the main handle 12—27 and the secondary handle 33—43, when in their open position (Figures 5 and 6), permit both hands to be used to keep the handbag open in order to enable the respective articles to be poured or otherwise placed into the container space 10 in cases where the bag and its container is not being supported as, for instance, by a table, it thus having to be held open by hand.

The main handle 12—27 (Figures 1 to 27) is shaped in the form of a yoke, is made of some suitable rigid material such as an artificial resin plastic, celluloid, wood or light metal, has a polished surface finish and comprises an approximately rod-shaped central portion 12 the underside of which is provided with a curved surface 13 adapted to be grasped by one hand, to enable the entire handbag to be carried by one hand and to permit the handbag to be supported while the respective articles are being poured into the container space 10. In addition, the main handle 12—27 comprises two downwardly directed end portions 14 and 15 to which there are attached the flexible straps 29 and 32 by means of which the main handle 12—27 is attached to the container 1—11 of the handbag in such a manner as to permit universal relative movement; finally, the main handle 12—27 is provided on its rear side (Figure 13) with supporting means 16—24 which, while the handbag is being carried, serve to support and keep in position the secondary handle 33—43 and to absorb the forces introduced into the latter. The said supporting means 16—24 (Figures 13 to 16) comprise a groove 16 with open ends and opening in an upwardly direction, this groove being arranged on the rear side of the main handle 12—27, disposed parallel with the longitudinal axis I—I of the main handle 12—27, defined on one side by a ledge 17 and on the other side by a vertical guide wall 18 and being slightly shorter than the distance X between the two end portions 14 and 15. Adjacent to each end of the groove 16 there are arranged the supporting surfaces 19 and 20, respectively, these supporting surfaces extending along the guide wall 18 and parallel with the longitudinal axis I—I of the main handle 12—27, being accessible from above and forming continuations of the bottom of the groove 16. In order to provide for rapid and convenient guiding or insertion, respectively, of the secondary handle 33—43 into the supporting means 16—24 of the main handle 12—32, the ledge 17 is provided on its ends with longitudinally disposed diagonal surfaces 22; in addition, there is provided on each of the end portions 14 and 15 a guiding surface 23 and 24, respectively, these surfaces extending parallel to the supporting surfaces 19 and 20, respectively. The universally movable fastening of the main handle 12—27 to the container 1—11 is provided for by two flexible straps 29 and 32 each of which is made of some suitable flexible strip material such as leather, textile material, plastic combined with textile material, etc., these straps being provided at their upper ends with loops 30 having eyes 31 serving to attach the straps to the main handle 12—27, the said straps being further provided at their lower ends with fastening eyes 5 and 6, respectively, serving to fasten the straps in any suitable known manner to the rear wall 4 of the container 1—11. For the purpose of attaching the two straps 29 and 32 there is provided in each of the end portions 14 and 15 of the main handle 12—27 (Figures 17 to 20 and 24 to 27) a downwardly opening blind hole 25 into which there is inserted the loop 30 of the strap 29 or 32, respectively, together with its pin 28 the two ends of which are supported in drill holes 26 and 27, respectively, provided in the main handle 12—27, secured in position and extending with the central pin portion through the eye 31 of the strap loop 30.

The secondary handle 33—43 (Figures 1 to 11 and 28 to 32) is shaped in the form of a yoke, is made of some suitable rigid material such as an artificial resin plastic, celluloid, wood or light metal, has a polished surface finish and comprises an approximately rod-shaped central portion 33 (Figures 28 to 32) and two downwardly directed end portions 34 and 35 similar in shape to the end portions 14 and 15 of the main handle 12—27, these end portions serving to receive and hold in position the flexible straps 44 and 45 by means of which the secondary handle 33—43 is attached to the front wall 1 of the container in such a manner as to permit universal relative movement, the straps being attached by means of the eyes 1 and 3. In addition, the secondary handle 33—43 comprises holding means 36—42 directly serving independently to hold the secondary handle 33—45 in position on the supporting means 16—24 incorporated in the main handle 12—27 and adapted to transmit to the main handle 12—27 all forces exerted on the secondary handle 33—43 as long as the main handle 12—27 and the secondary handle 33—43 remain in the carrying positions indicated in Figures 1 to 4 and 7 to 11. The holding means 36—42 provided on the secondary handle 33—43 are provided on the underside of the central portion 33 of the secondary handle with a downwardly projecting holding ridge 36 (Figures 28 to 32) which extend between the ends 34 and 35 of the secondary handle 33—43 and the profile of which is shaped in such a manner that the said ridge can be easily inserted from above into the supporting groove 16 of the main handle 12—27 and accommodated therein. Moreover, the holding means 36—42 are provided with two bearing surfaces 37 and 38 arranged on the rear side of the secondary handle 33—43 (Figures 28 to 31) adjacent to the ends of the holding ridge 36, adapted for access from below, disposed parallel to the longitudinal axis II—II of the secondary handle 33—43 and permitting the secondary handle 33—43 to be supported and held in position by the supporting surfaces 19—20 provided on the main handle 12—27. Finally, there is provided on the back of the secondary handle 33—43 (Figures 28 to 30) a vertical sliding surface 40 extending between the upper edge 39 of the secondary handle 33—43 and leading to the two bearing surfaces 37 and 38 and to the holding ridge 39; provided on the rear sides of the two end portions 34 and 35 of the secondary handle 33—43 are the vertical sliding surfaces 41 and 42, respectively, which extend between the bearing surfaces 37 and 38 and the lower edges of the said end portions 34 and 35; both the surface 40 and the surfaces 41 and 42 are adapted to permit the secondary handle 33—43 to be rapidly and easily guided in an upward direction onto the supporting means incorporated in the main handle 12—27, to keep the secondary handle 33—43 securely in position on the supporting means 16—24 and to insure reliable transmission of the forces acting upon the secondary handle 33—43 to the supporting surfaces 19 and 20 and the guiding surfaces 18, 23, 14 of the main handle 12—27.

A particularly important portion of the secondary handle 33—43 is constituted by the projection 43 provided at the right-hand end 35, shaped nose- or finger-fashion and adapted for being moved by light finger pressure acting upon its underside in an upward direction and further adapted to be subsequently moved laterally in the direction of the arrows V and W (Figures 2, 4, 8, 10) in order to lift and separate from the main handle the secondary handle 33—43 held in position by the supporting means 16—24 incorporated in the main handle 12—27.

The arrangement and universally movable attachment of the main handle 12—27 and the secondary handle 33—43 to the aforementioned container 1—11 is such that with the two said handles being in their carrying position (Figures 1 to 4 and 7 to 11) the holding ridge 36 of the secondary handle 33—43 is engaged in the groove 16 of the main handle 12—27, that the bearing surfaces 37 and 38 of the secondary handle 33—43 rest upon the supporting surfaces 19 and 20 of the main handle 12—27 and that the sliding surfaces 40, 41, 42 of the secondary handle 33—43 rest against the guiding surfaces 18, 23, 24 of the main handle 12—27, while there is no contact whatever between the secondary handle 33—43 and the main handle 12—27 as long as the said handles are not locked together, i. e. as long as they are in their open or separated position as indicated in Figures 5 and 6.

As far as the shape of the main handle 12—27 and the secondary handle 33—43 is concerned it will be understood that the central portion 12 of the main handle 12—27 and the central portion 33 of the secondary handle 33—43 are profiled in such a manner that the aggregate circumference of the two handles when placed together or mutually engaged constitutes the approximate shape of an ellipse or circle, respectively (Figure 11), and that they thus afford convenient use of the main handle 12—27 and the secondary handle 33—43 supported by the former and permit easy carrying of the entire handbag by one hand.

The manner in which the novel device for carrying the container of a handbag combined with the said device is used and operated is as follows.

When it is intended to place articles such as foodstuffs, for example, into the space 10 of the container or to remove such articles from the same, the shopping bag is placed on a table, the main handle 12—27 and the secondary handle 33—43 being brought into their open position in which position the main handle 12—27 will be suspended along the rear wall 4 of the container, while the secondary handle 33—43 will be suspended along the front wall 1, the result being that the container space 10 is freely accessible from above and can be filled or emptied as required.

When it is intended, however, to hold the shopping bag open (Figures 5 and 6), in order that some article such as fruit, for example, may be quickly placed in the container space 10, the main handle 12—27 is grasped by the right hand, while the secondary handle 33—43 is grasped by the left hand, the two handles then being brought into the so-called holding position (Figures 5 and 6) in which the main handle 12—27 is held by the right hand and the secondary handle 33—43 is held by the left hand, both handles being held diagonally upward in relation to the container so that unobstructed access is afforded to the container space 10 through its opening 11.

When it is intended to carry the shopping bag along, the main handle 12—27 and the secondary handle 33—43 are brought into mutual engagement, i. e. into their carrying position (Figures 1 to 4), this being effected in the following manner: While the right hand keeps the main handle 12—27 in its holding position, the left hand grasps the secondary handle 33—43 and brings its sliding surface 40 into contact with the guiding surface 18 of the main handle 12—27, this being done in such a manner that the supporting ridge 17 of the main handle 12—27 is moved into the clearance Y of the secondary handle 33—43, whereupon the secondary handle is guided downwardly along the guiding surfaces 18, 23 and 24 of the main handle 12—27 until the holding ridge 36 of the secondary handle 33—43 engages in the supporting groove 16 of the main handle 12—27 and the bearing surfaces 37 and 38 of the secondary handle 33—43 are simultaneously brought into contact with the supporting surfaces 19 and 20 of the main handle 12—27. As soon as the main handle 12—27 and the secondary handle 33—43 have assumed the aforementioned carrying position (Figures 1 to 4 and 7 to 11), the secondary handle 33—43 is held in position on the main handle 12—27 by its supporting means 16—24, these supporting means then preventing the secondary handle 33—43 from being displaced laterally, longitudinally and vertically relative to the main handle 12—27, and the supporting means further serving to absorb the forces acting upon the secondary handle 33—43.

When it is intended to bring the main handle 12—27 and the secondary handle 33—43 from their carrying position (Figures 1 to 4 and 7 to 11) into their holding position or position of disuse (Figures 5 and 6), the left hand is moved toward the secondary handle 33—43 held in position on the main handle 12—27, the little finger of the left hand exerting a slight pressure on the lifting lug 43 in a diagonally upward direction (direction of the arrows V and W, Figures 2, 4, 8, 10), this pressure serving to lift the holding ridge 36 of the secondary handle 33—43 out of the supporting groove of the main handle 12—27, whereupon the secondary handle 33—43 will immediately slide from the supporting means 16—27 of the main handle 12—27 onto the left hand so that it can be safely grasped.

In comparison to all heretofore known carrying devices of handbags, the action of and the manner of using the main handle 12—27 and the secondary handle 33—43, in combination with their universally movable attachment to a handbag, afford above all a saving in time, extremely convenient carrying of handbags, prolonged service life and easier cleaning of the handbag handles.

The alternative embodiment of the device according to the invention illustrated in Figures 33 to 41 is particularly adapted for use in combination with the bag-like containers of elegant handbags; it comprises a main handle 46—52, two flexible straps 53 and 59 attached to the main handle, a secondary handle 60—62 and two flexible straps 63 and 64 attached to the secondary handle, the aforementioned straps serving to attach the main handle 46—52 and the secondary handle 60—62 to a handbag container in such a manner as to permit universal relative movement. The construction of the main handle 46—52 and the secondary handle 60—62 is substantially the same as that of the main handle 12—27 and the secondary handle 33—43, respectively, which are illustrated in Figures 1 to 33, the only difference residing in the means by which the straps 53, 59, 63, 64 are attached to the main handle 46—52 and the secondary handle 60—62. More in particular, each end 47, 48 of the main handle 46—52 and each end 61, 62 of the secondary handle 60—62, all of which are of substantially like construction, is fitted with a downwardly projecting metallic eye 49—52 having an integral serrated retaining stem 50 (Figures 35—41); one each of the upper ends 54 of the band-shaped straps 53, 59, 63, 64 is threaded through one of the slot-shaped eyes 51, the projecting end of the strap then being permanently attached to the strap itself, for example by means of cementing or sewing, in such a manner that a loop is formed at the upper end of each strap, these loops extending through the respective slot 51 of the eye 49—52. In order to prevent the eyes 49—52 and the strap ends attached to them from becoming dirty, a metallic protective cap 55 or 65 is slid over the eye and the end of the strap, the protective cap being a press fit on the side walls 52 of the eye 49—52 and having in its bottom 56 a rectangular hole 57 through which the straps 53, 59, 63, 64 are passed and the edge 58 of which closely surrounds the aforementioned strap in order to exclude dirt. The eyes 49—52, together with their serrated stems 50, are secured in the ends 47 and 48 of the main handle 46—52 and in the ends 61 and 62 of the secondary handle 60—62 by causing the plastic material of which the main handle 46—52 and the secondary handle 60—62 are made to flow around the serrated stems 50 of the eyes 49—52.

The alternative embodiment of the device according to the invention which is illustrated in the Figures 42 to 45 is particularly suitable for use in combination with the net-like receptacle of a shopping net; this embodiment comprises a main handle 69—71, a secondary handle 80—82 and fastening means 72—79 and 83—90, respectively, serving to attach the main handle 69—71 and the secondary handle 80—82 to the net-like receptacle 66—68 in such a manner as to permit universal relative movement. The construction of the main handle 69—71 and the secondary handle 80—82 is substantially the same as that of the main handle 12—27 and the secondary handle 33—43 respectively indicated in Figures 1 to 33, the only difference residing in the fact that the end portions of the handles are adapted to receive annular eyes. The main handle 69—71 has two downwardly directed solid end portions 70 and 71 into which are threaded the threaded portions 73 and 75, respectively, of the two downwardly projecting annular eyes 72 and 74, and the secondary handle 80—82 has two downwardly directed solid end portions 81 and 82 into which are threaded the threaded portions 84 and 86, respectively, of the two downwardly projecting annular eyes 83 and 85. Arranged in movable engagement with each of the annular eyes 72, 74, 83, 85 is one each of the metallic supporting rings 76, 77, 87, 88, these rings serving to attach the main handle 69—71 and the secondary handle 80—82, respectively, to the net-like container 66—68; the said rings are attached by means of knots to the border 67 of the net-shaped container 66—68, this method of attaching using loops 78, 79, 89, 90 made of some suitable textile material and connected with the rings by knotting, or using loops 68 formed integral with the border 67 of the net-like container 66—68.

The method used in attaching the device according to the invention indicated in Figures 42 to 45 to the net-like receptacle 66—68, the mode of operation of the device and the manner in which it is used are substantially the same as described earlier in this description in connection with the main handle 12—27 and the secondary handle 33—43 llustrated in Figures 1 to 33.

I claim:

1. A device for carrying receptacles comprising a pair of substantially bar-like handle members having fasteners disposed at the ends thereof, a groove in one handle member located intermediate of the fasteners, and a corresponding ridge on the other handle member to fit within the groove to effect interlocking engagement between said handle members.

2. A device as set forth in claim 1 having, in addition, a projection on the ridge-bearing handle member by which said member may be lifted out of interlocking engagement with said other handle member.

3. A device for carrying receptacles comprising a pair of substantially straight handle members having fasteners disposed at the ends thereof, flat abutting surfaces on the handle members, a recess on one member located on a side opposite to that of the abutting surface and disposed between said fasteners, and a projection on the other handle member positioned between the fasteners and having surfaces thereon for interlocking engagement with the recess on the said one member.

4. A device as set forth in claim 3 in which each fastener comprises a recess in an end portion of a handle member and a pin mounted therein upon which a strap is fastened for supporting a receptacle.

5. A device as set forth in claim 4 in which each pin is inserted into an end portion of a handle member and has a protective cover plate secured around it and an eye to receive a strap for supporting a receptacle.

6. A device for carrying receptacles comprising a pair of handle members, a projection on one handle member, a groove on the other handle member for interlocking engagement with the projection on said one handle member, and stoppers on the ends of said projection to avoid shifting of the projection-bearing handle member along the groove of the other handle member when said handle members are in interlocking engagement.

7. A device for carrying receptacles comprising a handle member having a recess, a second handle member having a correspondingly shaped projection to fit within the recess on the first mentioned member to effect interlocking engagement between said members, and fastening means at the handle members to receive straps or strings for supporting a receptacle, and separating means disposed on the said second handle member by which the projection bearing handle member may be lifted out of interlocking engagement and both handle members may be separated and removed from each other.

8. A device for carrying receptacles comprising a handle member having a plurality of handle ends, a groove-shaped recess between said handle ends, a second handle member having a plurality of handle ends, a projection between the handle ends of said second handle member correspondingly shaped to fit within the recess on the first-mentioned member to effect interlocking engagement between said handle members, fastening means located at said handle ends to receive supporting members of a receptacle, and stoppers on the ends of the projection and the groove-shaped recess to obtain correct positioning of the handle members and to avoid shifting of the handle members while in interlocking engagement.

9. A device as set forth in claim 8 having separating means on one handle member by which one handle member may be lifted out of interlocking engagement from the other.

10. A device as set forth in claim 9 having one supporting surface located on the recess-bearing handle member forming the entire underside of the device when the handle members are in interlocking engagement, said surface protecting the hand from contact with the underside of the projection-bearing handle member.

References Cited in the file of this patent

UNITED STATES PATENTS

| | | |
|---|---|---|
| Re. 23,629 | Henriksen | Mar. 10, 1953 |
| 403,928 | Emeric | May 28, 1889 |
| 1,359,461 | Luce | Nov. 16, 1920 |
| 1,979,978 | Martin | Nov. 6, 1934 |
| 2,170,841 | Thies et al. | Aug. 29, 1939 |

FOREIGN PATENTS

| | | |
|---|---|---|
| 215,864 | Germany | Nov. 9, 1909 |